J. P. HAYES.

Petroleum Burner for Cooking, &c.

No. 2,120. Reissued Dec. 5, 1865.

Witnesses.
Bry Munton
Wm H. Morrison

Inventor
John P. Hayes

UNITED STATES PATENT OFFICE.

JOHN P. HAYES, OF PHILADELPHIA, PENNSYLVANIA.

PETROLEUM-BURNER FOR COOKING, &c.

Specification forming part of Letters Patent No. 50,121, dated September 26, 1865; Reissue No. 2,120, dated December 5, 1865.

*To all whom it may concern:*

Be it known that I, JOHN P. HAYES, of the city of Philadelphia, in the State of Pennsylvania, have invented a new and useful Improvement in Oil or Petroleum Burners for Heating and Cooking; and I do hereby declare that the following is a full, clear, and exact description of the construction and operation of the same, reference being had to the accompanying drawings, making a part of this specification, in which—

Figure 1:
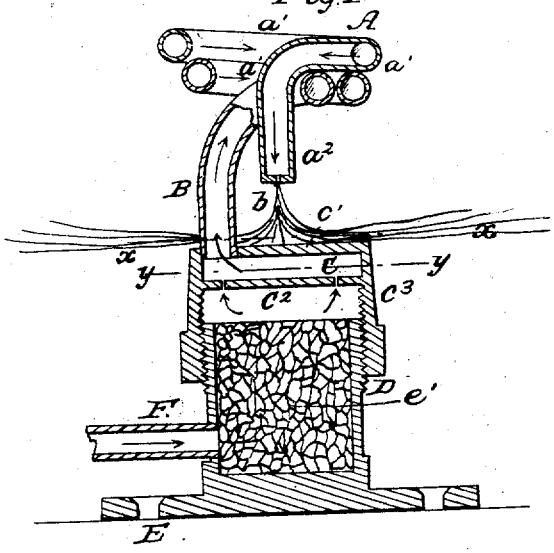
Figure 2:
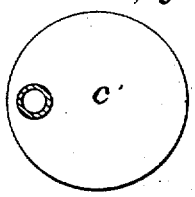
Figure 3:
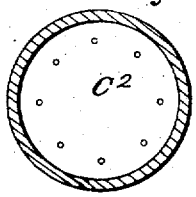

Figure 1 represents a vertical half-section of the said improved burner; Fig. 2, a plan view of the upper side or plate of its heating-chamber below the dotted line $x$ of Fig. 1; and Fig. 3, a like view of the perforated diaphragm or bottom of the said chamber below the dotted line $y$ of the same figure, like letters of reference indicating the same parts when in the different figures.

The object of my invention is to produce a burner for cooking and heating by the combustion of oil, petroleum, or other hydrocarbons, that will give a much larger and more intensely heated flame than any burner heretofore produced for the same purposes.

The nature of my invention consists, substantially as hereinafter described, in causing the gasified oil, or petroleum, or other hydrocarbon used to be discharged in a downward direction from a heater or generator above, so as to impinge against a plate or heating-chamber below in such a manner that the gas issuing from the said generator above and impinging against the said plate or chamber below will be spread out horizontally, and also upward, around, and in contact with the generator above, in such a manner as to envelop the said generator in flame when the said gas is ignited, cause a more perfect and rapid conversion of the heated oil, petroleum, or other hydrocarbon used into gas, and its more rapid delivery in its downward direction against the plate or heating-chamber below, and therefore a more extended and intensely heated flame; and, second, the nature of my invention also consists, in combination with the said generator above and the said plate or chamber below it, in the employment of a strainer and diffuser of the oil or petroleum at a point between the usual supply-reservoir and the said heating-chamber or plate, substantially as hereinafter described.

In the drawings, A B is the generator; C, the heating chamber below it; D E, a supporting stand or base containing the strainer or diffuser $e'$, and F a short section of a tube intended to lead into any suitable reservoir for supplying the hydrocarbon.

The base or stand D E is a cylindrical metallic cup having a flanged bottom sufficiently large to support the whole burner firmly in a vertical position. At one side, near its bottom, the tube F, which leads to the reservoir, (not shown in the drawings,) is tightly inserted, and the interior of the cup is nearly filled with small broken fragments of pumice-stone or gravel, $e'$.

The heating-chamber C is also made of metal, and consists of a circular top plate, $c'$, and a circular perforated bottom or diaphragm, $c^2$, each united by their edges to a hollow case or cylindrical band, $c^3$, so as to form together a shallow chamber, C, between them at the upper end of the band $c^3$, while the lower end of the cylinder formed by the said band $c^3$, being adapted for the purpose, is screwed tightly over the upper end of the stand D E. (See Fig. 1.)

The generator A B is in this instance a tube bent into one or more coils, $a^1$, and has one of its ends inserted tightly into the top plate, $c'$, at a point near the edge of the latter, (see Figs. 1 and 2,) so as to communicate with the interior of the heating-chamber C, while its other end, $a^2$, is straight and brought so as to point downward in a vertical position over the center of the top plate, $c'$, of the chamber C, and with its said free end $a^2$ at about half an inch (more or less) above the said plate. (See Fig. 1.) The free end $a^2$ of the tube A B is closed, with the exception of a very small vertical hole, $b'$, through the center of the plug or closing-disk thereof.

The burner described being placed in an empty fire-place or grate, and connected by means of the tube F with a sufficiently elevated reservoir of the combustible fluid to be used and the stop-cock of the said reservoir opened, the fluid passes through the strainer and diffuser $e'$, thence, as indicated by the arrows, through the perforated diaphragm or bottom $c^2$ into the heating-chamber C, thence up through the generator A B to the small orifice $b'$ in its end, and, passing through this in a comparatively minute stream, it finally impinges against the center of the top plate, $c'$, of the chamber C, and eventually envelops the generator, the gas being ignited, and the flame soon heats both the generator above and the plate or chamber below, and the combustible fluid therein, becoming more and more heated, is converted into gas, which is forced continually downward against the plate $c'$, thus producing an intensely-heated circular horizontal flame having a diameter of six or eight inches, and enveloping the generator A B, the said burner being about the size shown in the drawings.

The whole burner is simple and inexpensive of construction, not liable to derangement, and is more effective for heating and cooking by the combustion of hydrocarbons, either crude or refined, than any other device known.

I do not intend to confine myself to the particular form or construction of either the generator A B or the chamber C, as it is obvious that each may consist of two spirally-grooved cast-iron plates united together so as to produce a spiral channel within it, which will effect the same purposes; but, Having fully described my improved burner and its principle of operation, what I claim as new therein, of my invention, and desire to secure by Letters Patent, is—

1. Causing the gasified hydrocarbon used to be discharged in a downward direction from a generator, so that it will impinge directly against a plate or heating-chamber beneath, substantially as and for the purposes described.

2. In combination with the subject matter of the preceding claim, the employment of any suitable strainer and diffuser, $e'$, of the hydrocarbon at a point between the usual supply-reservoir and the heating-chamber C or plate $c'$, as and for the purposes described.

J. P. HAYES.

Witnesses:

BENJ. MORISON,

JAS. WINSMORE.